Pattee & Nye,
Steam Vacuum Pump.
No. 103,076. Patented May. 17, 1870.

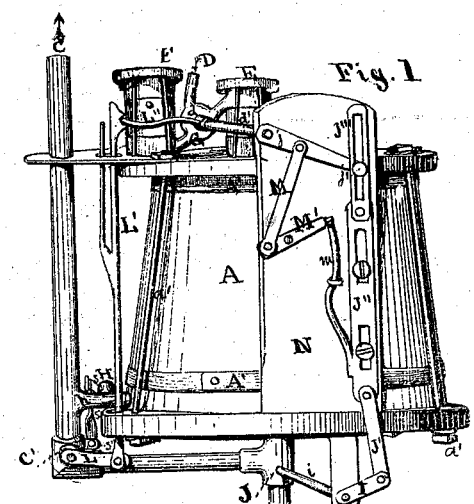
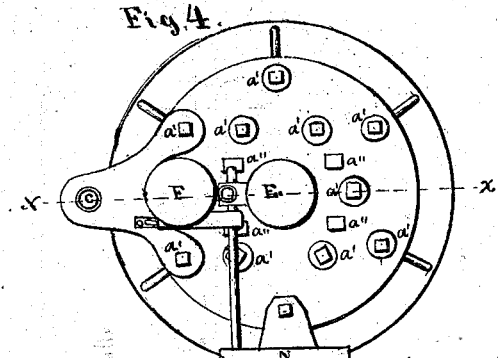
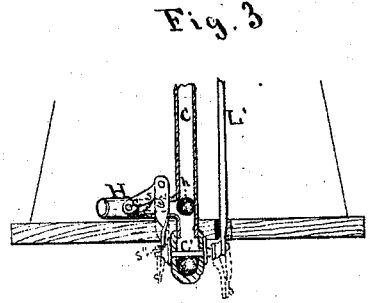
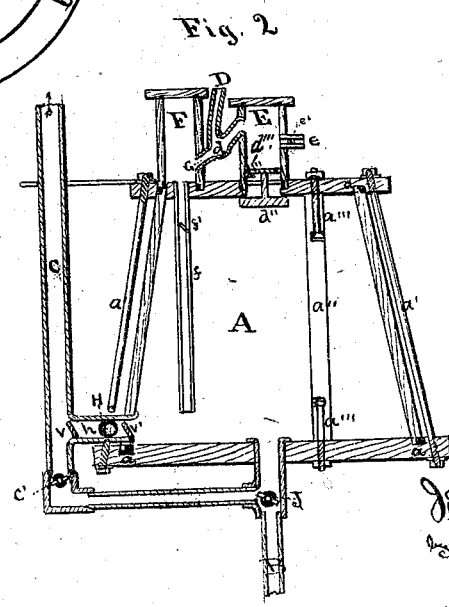

2 Sheets. Sheet 2.

Witnesses
H. A. Daniels
E. H. Hester

James H. Pattee
George H. Nye
by A. McCallum
Attorney 103,076

UNITED STATES PATENT OFFICE.

JAMES H. PATTEE AND GEORGE H. NYE, OF MONMOUTH, ILLINOIS, ASSIGNORS TO THEMSELVES, H. J. GRAHAM, AND H. H. PATTEE, OF SAME PLACE.

STEAM VACUUM-PUMP.

Specification forming part of Letters Patent No. 103,076, dated May 17, 1870.

We, JAMES H. PATTEE and GEORGE H. NYE, of Monmouth, in the county of Warren and State of Illinois, have invented certain Improvements in Automatic Steam Vacuum-Pumps, of which the following is a specification:

Nature and Objects of the Invention.

The nature of our invention relates to improvements in that class of pumps known as steam vacuum-pumps; and the invention consists in an arrangement of valve-gear so combined with and operated by the valves in the water inlet and outlet pipes as to operate and control the valves for the admission of steam, and for the admission of water for condensation purposes, all arranged as hereinafter fully described, for the purpose of rendering the whole device automatic. The invention also consists in the construction of wooden tanks, as hereinafter fully described.

Description of the Accompanying Drawings.

Figure 8:
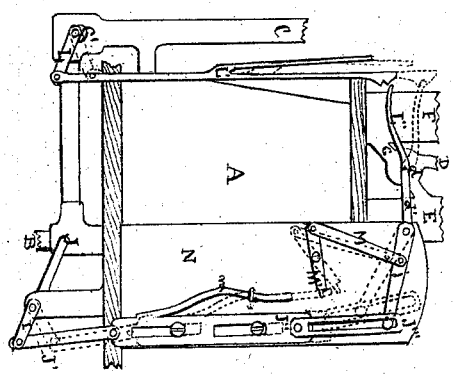
Figure 5:
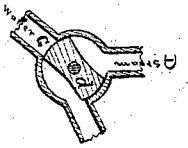
Figure 6:
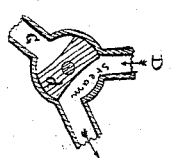
Figure 9:
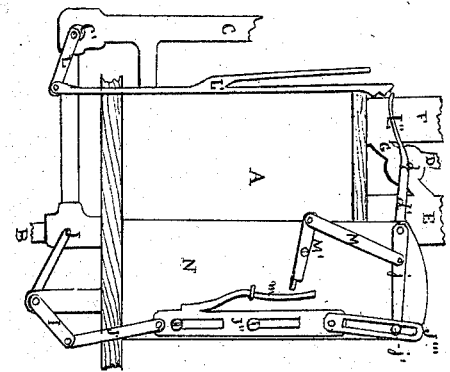
Figure 7:
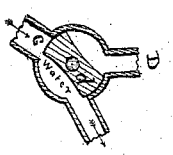

Figure 1 is a perspective view of a machine embodying our invention. Fig. 2 is a sectional view of Fig. 1 on the plane of the line $x\ x$, Fig. 4. Fig. 3 is an elevation, showing the lower part of the outlet-pipe C from a view at right angles to Fig. 2. Fig. 4 is a horizontal cross-section of one of our tanks, showing the construction. Figs. 5, 6, and 7 are sectional views of the three-way cock $d$, showing the different positions and operation of its valves; and Figs. 8 and 9 show the corresponding positions of the levers and arms by which the pump is operated.

General Description.

A is a wooden tank, constructed of tapering staves, with an annular rabbet cut round inside of each end of the tank to receive rubber packing $a$. The heads are then put in place and secured by the bolts $a'\ a'\ a'\ a'\ a'$, which are arranged alternately inside and outside, as shown by Fig. 4. Inside stays $a''\ a''\ a''$ pass from head to head. These are made of wood, and are secured in place by bolts $a'''\ a'''\ a'''$ screwed through the heads and into taps seated in the stays $a''\ a''\ a''$. Hoops A' A' may be added, as desired, the object being to produce a steam-tight wooden tank capable of resisting the pressure of the steam from within, and of the air from without when a vacuum is formed. B is the water-inlet pipe; C, the water-outlet pipe; D, the steam-inlet pipe. E is a dome or chamber seated on the top of the tank, and F a condensing water-chamber, also on the top of the tank. G is a pipe leading from the dome F to the dome E. The steam-pipe D also connects with the dome E. $d$ is a three-way cock for shutting off or making these connections, and is operated by rod $d'$. $d''$ is a piston-valve in the top of the tank A, suspended in a cross-bar, $d'''$. $e$ is a small air-pipe leading into dome E, having a globe and check valve, $e'$, opening inwardly. $f$ is a small pipe leading from the bottom of the dome F, through the head of tank A, and extending downward near to its bottom. It is provided with a check-valve, $f'$, opening upward. H is a blow-off pipe connecting with a pipe, $h$, which leads from the bottom of tank A to the water-outlet pipe C, above the discharge-valve C'. $c$ is an outwardly-opening valve in pipe H, and $v\ v'$ are check-valves in the pipe $h$, opening toward the outlet-pipe C. The valve $c$ is operated by arms $s\ s'\ s''$, connected with discharge-valve C'. J is a valve on the inlet-pipe B, opening upward, and connected by rod $i$ with arm I, which, in turn, is connected with arms $J'\ J''\ J'''$, the latter two of which are slotted and slide on studs, as shown in Fig. 1. These arms are operated by the rotation of the rod $i$, consequent on the opening and closing of the valve J. $d'$ is a shaft connected at one end to the three-way cock $d$, and carrying on its other end an arm, $j$, which, in turn, carries a stud, $j'$, working in the slot in the arm J'''. It is also connected with a lever, M', by an arm, M. $m$ is a rod secured to arm J'', working in an eye secured to standard N, which also supports these other arms and lever. L is an arm attached to the valve C', and carries on its free end a rod, L', which is provided with a hook on its upper end for the purpose of engaging with one end of the arm L'', the other end of which is secured to shaft $d'$. The domes E and F are constructed in a manner similar to tank A.

The operation of our invention is as follows: A vacuum being formed in the tank A in manner as hereinafter described, the water from the well will flow upward through pipe B and oven valve J, which, being rigidly connected with the rod or shaft $i$, will, in opening, impart by its rotation a downward motion to the connecting-arms I J' J'' J''', thereby bringing down arm $j$, which, being connected by shaft $d'$ with the three-way cock $d$, will bring said cock into position, as shown by Fig. 5, so as to shut off the inlet of steam or water through pipes D and G, and thereby allow the tank A to fill with water. Figs. 5 and 8 show the relative positions of cock $d$ and its connections at this stage of the operation. When the tank A is thus allowed to fill with water the vacuum will be destroyed and the valve J will fall of its own gravity, and the weight of water above it, causing, in its downward motion, the arms I J' J'' J''' to move upward, and at the same time the three-way cock $d$ is moved into the position shown in Fig. 6 by means of rod $m$ engaging with lever M', and, by pushing its free end up, it will bring arm $j$ still further down, and thereby bring cock $d$ into the required position so as to admit of the passage of the steam into tank A for the purpose of expelling the water through discharge-pipe C. The passage of the water through pipe C will open valve C', which, being rigidly attached to arm L, will raise rod L', with which it is connected, and cause it to engage with arm L'', which, as shown, is rigidly attached to rod $d'$. The opening of valve C' will, at the same time, operate to close the valve $c$ in pipe H by means of its connecting-arms $s\ s'\ s''$, as shown in Fig. 3. The relative positions of the cock $d$ and its connections at this stage of the operation are shown by Fig. 6 and the dotted lines of Fig. 8. When the bulk of the water is discharged from the tank A by the pressure of the steam, the steam will force a passage from the tank through the pipe $h$ to pipe C, when, of course, the valve C' will drop to its first position, bringing with it in falling its connections, whereby the three-way cock $d$ is again shifted so as to shut off the steam, open valve $c$ to allow the surplus steam to blow off through pipe H, and also open communication between domes F and E, when dome F, having been supplied with water through tube $f$ by the force of the steam, and the air therein compressed by the same force, a stream of water will be forced through pipe G into dome E, and thence into tank A, to condense the steam and form a vacuum. Figs. 7 and 9 and the dotted lines in Fig. 3 show the relative positions of cock $d$ and its connections at this third stage of the operation. The effect of forming the vacuum will be to close valves $f'$ and $v'$, and all communication with the interior of the tank, until it is sufficient to cause the water in the well to rise again and open valve J, and thus repeat the operation.

The construction and operation of the other parts of the invention are deemed sufficiently obvious without further description.

We claim as our invention—

1. The arms J' J'' J''' I $j$ and rod or shaft $d'$, or their equivalents, for operating the three-way cock $d$ by the vibration of the valve J, substantially as described, and for the purpose specified.

2. The combination of lever L, rod L', arm L'', and shaft $d'$ with the three-way cock $d$, substantially as and for the purpose specified.

3. The combination of valves J, shaft $i$, arms I J' J'' J''', rod $m$, lever M', arms M and $j$ with valve C', arm L, rods L', arm L'', and three-way cock $d$, the whole operating substantially as and for the purpose specified.

4. The pipes H $h$ with valves $v\ v'$ and $c$, when combined with the tank A and pipe C, substantially as described, and for the purpose set forth.

5. The levers $s\ s'\ s''$ and valves C' $c$, when arranged to operate substantially as and for the purpose specified.

6. The chamber or dome F and pipe $f$, with check-valve $f'$, combined with the three-way cock $d$, chamber or dome E, and valve $d''$, operating substantially as described, and for the purpose specified.

7. The combination and arrangement of the tank A, pipes B C, valves J and C', three-way cock $d$, and chambers E and F, in the manner substantially as and for the purpose specified.

8. The construction of the tank A stayed by bolts $a'\ a'\ a'\ a'$, arranged as described, and by stays $a''\ a''\ a''$ and hoops A' A', and provided with rubber or other suitable packing $a\ a$, substantially as described, and for the purpose specified.

JAMES H. PATTEE.
GEORGE H. NYE.

Witnesses:
H. B. BERGEN,
P. R. RICHARDS.